United States Patent
Roth et al.

(10) Patent No.: US 8,694,686 B2
(45) Date of Patent: Apr. 8, 2014

(54) USER PROFILE BASED CONFIGURATION OF USER EXPERIENCE ENVIRONMENT

(75) Inventors: Erik Roth, Shanghai (CN); Jinyung Park, Seoul (KR); Jaehwa Lee, Seoul (KR); Wookjin Chung, Seoul (KR); Stanley Kim, Seoul (KR); Soyoung Han, Seoul (KR); Heeyoung Hwang, Seoul (KR); Jiyeong Ku, Seoul (KR)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 12/995,707

(22) PCT Filed: Sep. 28, 2010

(86) PCT No.: PCT/KR2010/006591
§ 371 (c)(1),
(2), (4) Date: Aug. 30, 2011

(87) PCT Pub. No.: WO2012/011636
PCT Pub. Date: Jan. 26, 2012

(65) Prior Publication Data
US 2012/0023157 A1    Jan. 26, 2012

Related U.S. Application Data

(60) Provisional application No. 61/365,790, filed on Jul. 20, 2010.

(51) Int. Cl.
*G06F 15/16* (2006.01)
(52) U.S. Cl.
USPC .......................................... 709/248; 709/203
(58) Field of Classification Search
USPC ................. 709/217–229, 200–203, 246–249; 715/744–745, 810–811; 717/136–137
See application file for complete search history.

(56) References Cited

U.S. PATENT DOCUMENTS

| | | | |
|---|---|---|---|
| 6,725,303 B1 * | 4/2004 | Hoguta et al. | 710/106 |
| 6,771,290 B1 * | 8/2004 | Hoyle | 715/745 |
| 6,983,244 B2 | 1/2006 | Junqua et al. | |
| 7,636,365 B2 | 12/2009 | Chang et al. | |
| 7,734,148 B2 | 6/2010 | Lee | |
| 7,996,412 B2 | 8/2011 | Bae et al. | |
| 8,131,763 B2 | 3/2012 | Tuscano et al. | |
| 2003/0236770 A1 | 12/2003 | Kurapati et al. | |

(Continued)

FOREIGN PATENT DOCUMENTS

| | | |
|---|---|---|
| EP | 1835384 A2 | 9/2007 |
| JP | 2004-38283 A | 2/2004 |

(Continued)

*Primary Examiner* — Brendan Higa
(74) *Attorney, Agent, or Firm* — Birch, Stewart, Kolasch & Birch, LLP

(57) ABSTRACT

A user profile based configuration of user experience environment is disclosed. One embodiment of the present disclosure pertains to a method for generating a user experience environment for a device. The method comprises accessing a user profile associated with a device in a computing network in response to a request by the device for initializing or refreshing a user experience environment of the device. In one example embodiment, the user profile comprises data and metadata defining a communal user experience environment shared by the device and one or more other devices through the computing network. The method further comprises determining a type of the device, and generating the user experience environment of the device based on the user profile and the type of the device.

6 Claims, 14 Drawing Sheets

(56) References Cited

U.S. PATENT DOCUMENTS

| | | |
|---|---|---|
| 2004/0172588 A1 | 9/2004 | Mattaway |
| 2005/0030708 A1 | 2/2005 | Kawasaki et al. |
| 2005/0091595 A1 | 4/2005 | Shappell et al. |
| 2006/0117001 A1 | 6/2006 | Jung et al. |
| 2006/0271618 A1 | 11/2006 | Kokubo et al. |
| 2007/0005707 A1 | 1/2007 | Teodosiu et al. |
| 2007/0027926 A1 | 2/2007 | Kinouchi et al. |
| 2007/0050778 A1 | 3/2007 | Lee et al. |
| 2007/0156664 A1 | 7/2007 | Norton et al. |
| 2007/0180396 A1 | 8/2007 | Yajima et al. |
| 2007/0294357 A1 | 12/2007 | Antoine |
| 2008/0082936 A1 | 4/2008 | Helvick |
| 2008/0310510 A1 | 12/2008 | Hiwasa et al. |
| 2009/0023395 A1 | 1/2009 | Chang et al. |
| 2009/0049380 A1 | 2/2009 | Rehling et al. |
| 2009/0094531 A1 | 4/2009 | Danieli et al. |
| 2009/0157513 A1 | 6/2009 | Bonev et al. |
| 2009/0158170 A1 | 6/2009 | Narayanan et al. |
| 2009/0249359 A1* | 10/2009 | Caunter et al. ................ 719/315 |
| 2009/0299960 A1 | 12/2009 | Lineberger |
| 2009/0307168 A1 | 12/2009 | Bockius et al. |
| 2009/0313004 A1* | 12/2009 | Levi et al. ....................... 703/28 |
| 2010/0030578 A1 | 2/2010 | Siddique et al. |
| 2010/0043061 A1 | 2/2010 | Martin et al. |
| 2010/0066698 A1 | 3/2010 | Seo |
| 2010/0088634 A1 | 4/2010 | Tsuruta et al. |
| 2010/0122184 A1 | 5/2010 | Vonog et al. |
| 2010/0138767 A1 | 6/2010 | Wang et al. |
| 2010/0169823 A1 | 7/2010 | Audet |
| 2010/0174993 A1 | 7/2010 | Pennington et al. |
| 2010/0241980 A1 | 9/2010 | Sosnosky et al. |
| 2010/0241989 A1 | 9/2010 | Wen |
| 2010/0295992 A1 | 11/2010 | Lee et al. |
| 2010/0299628 A1 | 11/2010 | Har'El et al. |
| 2011/0066957 A1 | 3/2011 | Prats et al. |
| 2011/0113385 A1 | 5/2011 | Sayers et al. |
| 2012/0092253 A1 | 4/2012 | Irani et al. |

FOREIGN PATENT DOCUMENTS

| | | |
|---|---|---|
| JP | 2004-62369 A | 2/2004 |
| JP | 2005-285274 A | 10/2005 |
| JP | 2007-42173 A | 2/2007 |
| JP | 2007-272625 A | 10/2007 |
| JP | 4564488 B2 | 10/2010 |
| KR | 10-2005-0055101 A | 6/2005 |
| KR | 10-2005-0099741 A | 10/2005 |
| KR | 10-2008-0023575 A | 3/2008 |
| KR | 10-2009-0062371 A | 6/2009 |
| KR | 10-2009-0113508 A | 11/2009 |
| KR | 10-2010-0002758 A | 1/2010 |
| WO | 2008/048008 A1 | 4/2008 |

\* cited by examiner

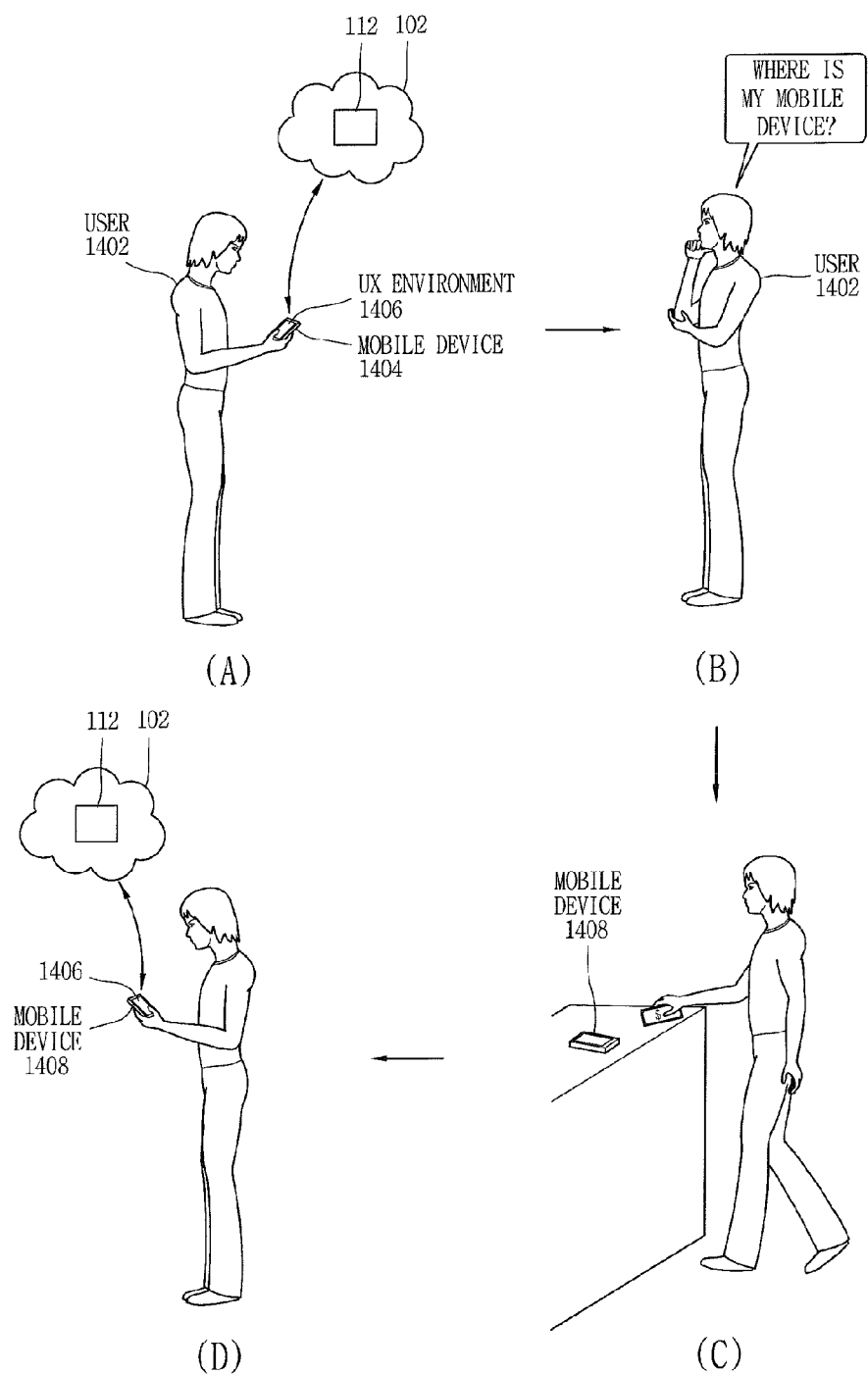

USER PROFILE BASED CONFIGURATION OF USER EXPERIENCE ENVIRONMENT

This application is the National Phase of PCT/KR2010/006591 filed on Sep. 28, 2010, which claims priority under 35 U.S.C. 119(e) to U.S. Provisional Application No. 61/365,790 filed on Jul. 20, 2010, all of which are hereby expressly incorporated by reference into the present application.

FIELD OF TECHNOLOGY

Embodiments of the present disclosure relate to the field of electronics. More particularly, embodiments of the present disclosure relate to configuration of the user experience environment of electronic devices.

BACKGROUND

User experience (UX) refers to the interaction of person with a system including their actions and perceptions, e.g., what the person wants to do, what they actually do and their feels about using the system, etc. User experience highlights the experiential, affective, meaningful and valuable aspects of human-computer interaction and product ownership, but it also covers a person's perceptions of the practical aspects such as utility, ease of use and efficiency of the system. User experience is subjective in nature, because it is about an individual's performance, feelings and thoughts about the system. User experience is dynamic, because it changes over time as the circumstances change.

Recent advances in mobile, ubiquitous, social, and tangible computing technologies have moved human-computer interaction (HCI) into practically all areas of human activity. This has led to a shift away from usability engineering to a much richer scope of user experience, where user's feelings, motivations, and values are given as much, if not more, attention than efficiency, effectiveness and basic subjective satisfaction.

SUMMARY

One embodiment of the present disclosure pertains to a device for generating a user experience environment. The device comprises a memory and a processor coupled to the memory, where the processor is configured to access a user profile associated with the device in a computing network when the device is connected to the computing network for initializing or refreshing a user experience environment of the device. In one embodiment, the user profile is operable to generate a communal user experience environment shared by the device and one or more other devices through the computing network. The processor is also configured to determine a type of the device. The processor is further configured to generate the user experience environment of the device based on the user profile and the type of the device.

Another embodiment of the present disclosure pertains to a method for generating a user experience environment for a device. The method comprises accessing a user profile associated with a device in a computing network in response to a request by the device for initializing or refreshing a user experience environment of the device. In one example embodiment, the user profile comprises data and metadata defining a communal user experience environment shared by the device and one or more other devices through the computing network. The method further comprises determining a type of the device, and generating the user experience environment of the device based on the user profile and the type of the device.

BRIEF DESCRIPTION OF THE DRAWINGS

Example embodiments are illustrated by way of example and not limitation in the figures of the accompanying drawings, in which like references indicate similar elements and in which:

FIG. 14 illustrates an exemplary process for synchronizing a device with an associated device of same type through a cloud computing network, according to one embodiment.

Figure 1:
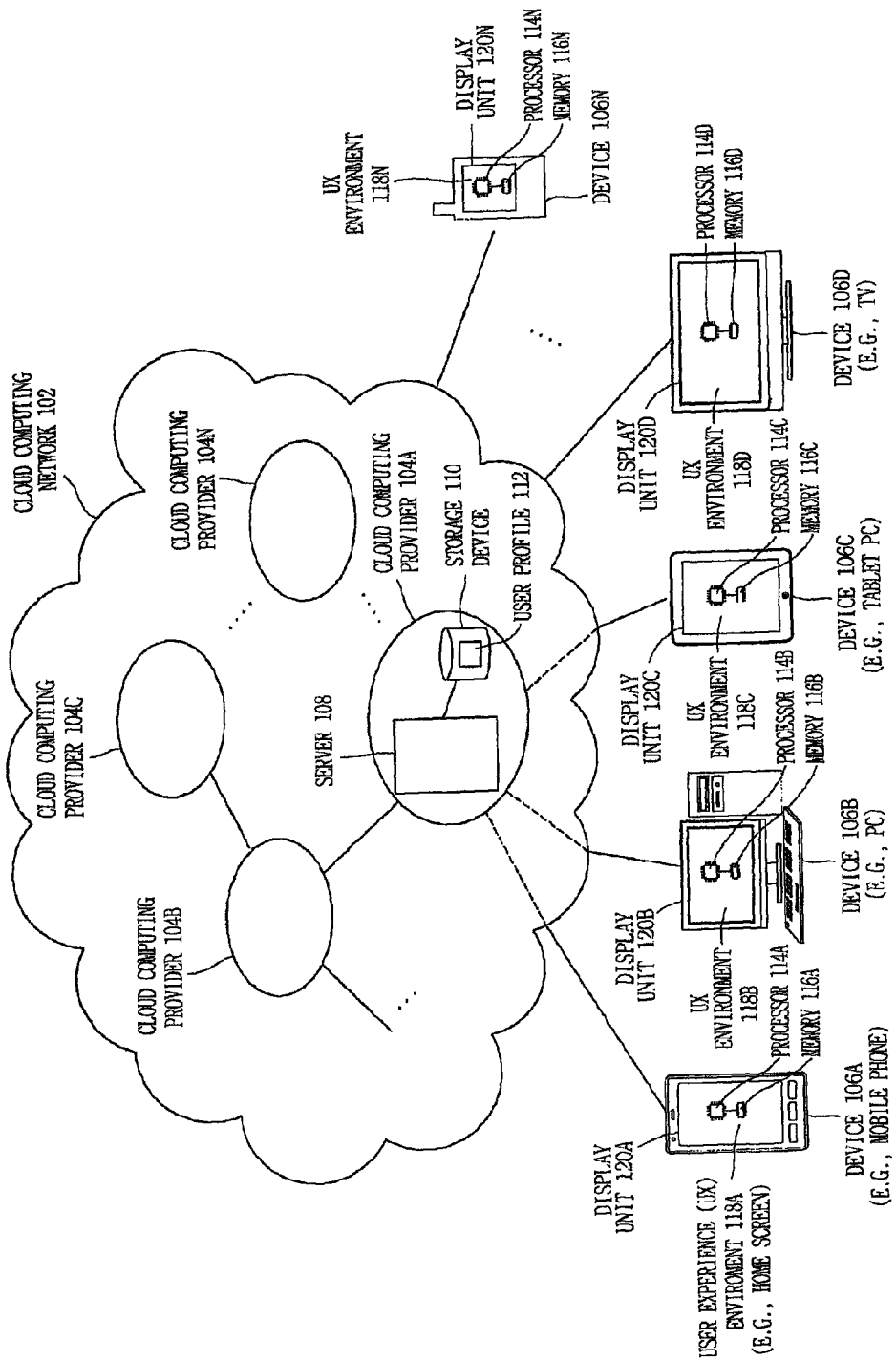
FIG. 1 illustrates a view of an exemplary apparatus for generating a user experience environment of a device, according to one embodiment.

Other features of the present embodiments will be apparent from the accompanying drawings and from the detailed description that follows.

DETAILED DESCRIPTION

A method, device and/or system that generate a user experience environment of a device based on a user profile associated with the device are disclosed. According to embodiments of this disclosure, user experience environments (e.g., home screens) of devices operated by a user may be synchronized based on a user profile stored and maintained in a computing network. For example, a user may own a number of devices (e.g., a mobile phone, a television, a tablet PC, a laptop, a PC, etc.) which can share the same or similar user experience environment.

The user may work on one particular device more often than others, thus modifying the contents, applications, widgets, etc. available on the particular device. Then, the user may want to reflect the changes that took place on the particular device to other devices the user already owns but does not use often. Further, the user may want to download the same user experience environment to a new device the user has recently acquired (e.g., purchased).

As a solution, the user may synchronize the devices by manually loading the user experience environment of the particular device to other devices. However, it may take significant time and efforts to do so. The embodiments of the present disclosure make it possible for the user to efficiently synchronize multiple devices as long as the multiple devices share the same user profile. In one embodiment of the present disclosure, a user profile associated with one or more devices of a user is generated, maintained, and updated based on changes that occur to the user experience environment of the device(s).

For example, if there are any changes in the configuration of the user experience environment, such as addition or deletion of contents, applications, widgets, etc., the changes may be reflected to the user profile, which may be stored in a computing network. Then, the user profile may be used to define a communal user experience environment that is shared by the devices sharing the same user profile. Once the user profile is stored, then it may be used to generate a user experience environment of a new device, which is recently added to the computing network and is registered to share the user profile. Further, the user profile may be used to update one or more of the remaining devices that already share the user profile in the computing network.

As described above, the user profile based configuration of user experience environment may substantially reduce time and efforts to synchronize multiple devices owned by a single user. The feature of the automatic synchronization of the multiple devices may allow the user to share a same user experience environment (e.g., same applications, contents, widgets, etc.) for multiple devices owned by the user. Further, by maintaining, updating, and storing the user profile in the computing network, the user may be able to synchronize the user's multiple devices to the most recent user experience environment implemented to one of the user's multiple devices.

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present disclosure.

FIG. 1 illustrates a view of an exemplary apparatus for generating a user experience environment 118A of a device 106A, according to one embodiment. In FIG. 1, a cloud computing network 102 comprises multiple cloud computing providers 104A-N connected to each other through the cloud computing network 102 and multiple devices 106A-N connected to and/or serviced by the cloud computing network 102. It is appreciated that cloud computing is Internet-based computing whereby shared resources, software, and information are provided to computers and other devices on demand. In the cloud computing network 102, the cloud computing providers 104A-N deliver common business applications or other services online that are accessed from another web service or software like a web browser, while the software and data are stored on servers (e.g., a server 108) throughout the cloud computing network 102. Thus, the cloud computing network 102 allows users (e.g., the devices 106A-N) to access the business applications using a web browser regardless of their location or what device they are using.

In FIG. 1, the cloud computing provider 104A comprises the server 108 and a storage device 110 connected to the server 108. In one embodiment, a user profile 112 stored in the storage device 110 is a collection of personal data associated to a specific user of a device (e.g., the device 106A), where the description of the characteristics or profile of the user may be obtained from information (e.g., a set of data and/or metadata) collected via the device 106A and other devices that share the user profile 112. For example, the user prolife 112 of a particular user that operates the device 106A (e.g., a mobile phone), the device 106B (e.g., a personal computer), the device 106C (e.g., a tablet PC), and the device 106D (e.g., a TV) may be formed by collecting and analyzing the set of data and/or metadata collected through the devices. Although it is not shown, the user profile 112 may comprise data and/or metadata defining a communal user experience environment shared by the device 106A and one or more other devices 106B-N through the cloud computing network 102.

In one embodiment, each of the devices 106A-N comprises a processor and a memory. For example, a memory 116A of the device 106A may have a set of instructions stored therein, when executed by a processor 114A, causes the device 106A to access the user profile 112 which is stored in the storage device 110 and is associated with the device 106A in the cloud computing network 102 in order to implement the user experience environment 118A (e.g., a home screen) on the device 106A, where the user experience environment 118A may be shared by the device 106 and at least one other device with the same user profile 112.

Then, the type (e.g., hardware configuration) of the device 106A is determined. Further, the user experience environment 118A of the device 106A is generated or updated based on the user profile 112 and the type of the device 106A. This way, two or more devices that share the user profile 112 may be synchronized. For example, as illustrated in FIG. 1, any of the devices 106A-N (e.g., a mobile phone, a personal computer, a laptop computer, a tablet computer, or a television) which are connected to the cloud computing network 102 and share the user profile 112 may be able to initialize or update its user experience environment (e.g., the home screen) by connecting to the cloud computing network 102 and by performing the method described in FIG. 1.

Figure 2:
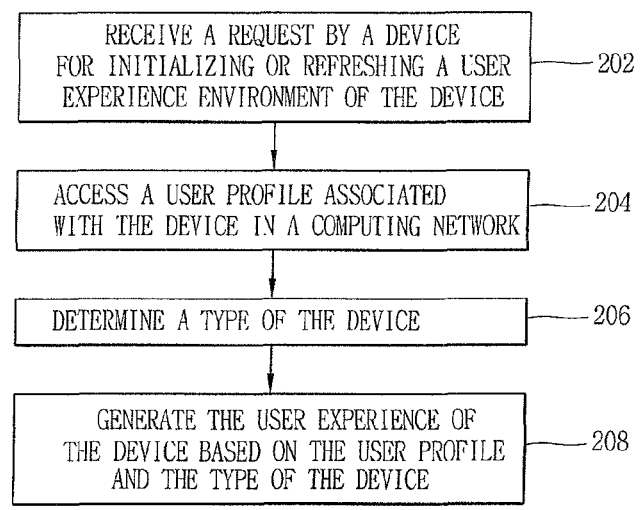
FIG. 2 illustrates a process flow chart of an exemplary method for generating a user experience environment of a device, according to one embodiment.
Figure 3:
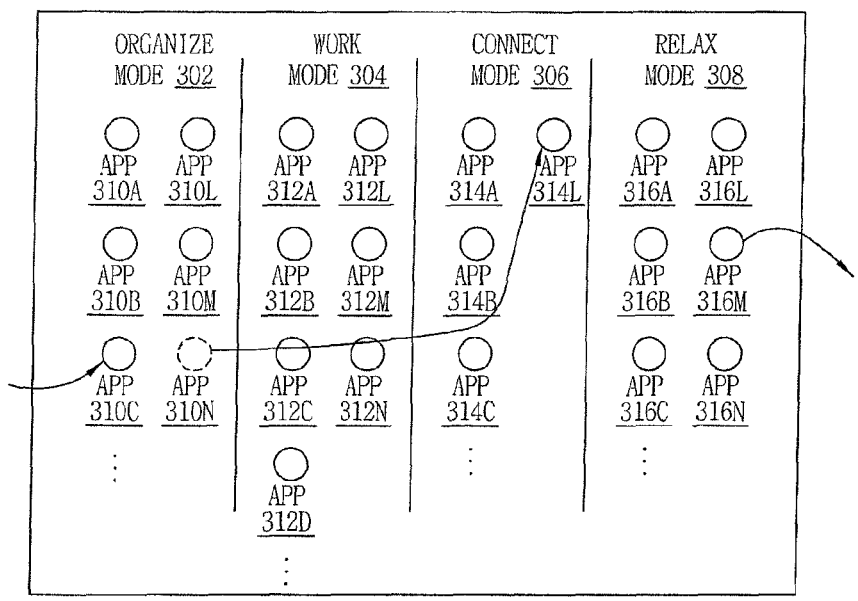
FIGS. 3 and 4 illustrate a view illustrating an exemplary process for updating a user experience environment of a device, according to one embodiment.
Figure 4:
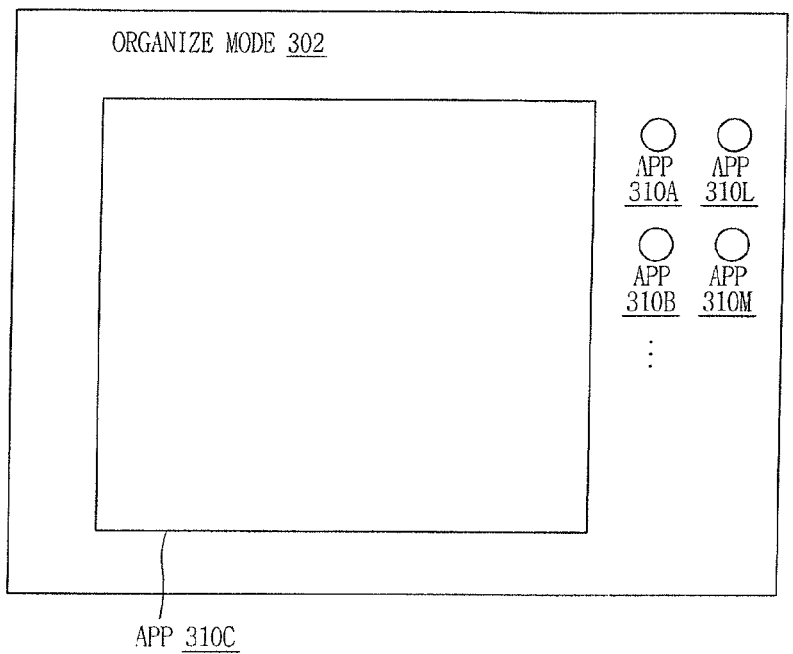
Figure 5:
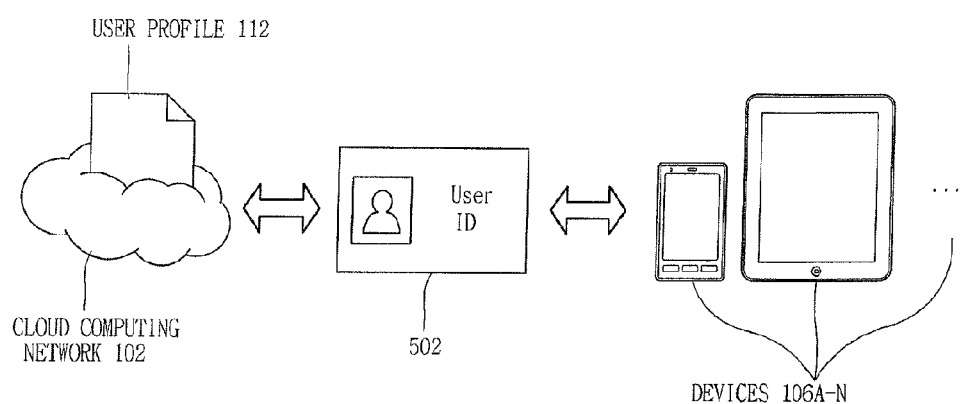
FIG. 5 illustrates a view of an exemplary process for synchronizing multiple devices based on a user profile associated with the multiple devices, according to one embodiment.

An example method of refreshing or updating the user experience environment 118A is illustrated in FIGS. 3 and 4 and the description therein. An example method of initializing or downloading the user experience environment 118A for the first time to a newly added device is illustrated in FIG. 5 and the description therein. It is appreciated the methods, systems, and the apparatus described in the disclosure illustrated in FIGS. 1-9 may be also enabled by any one of the computing systems or network systems, which include but are not limited to an automatic computing, a client-server model, a grid computing, a mainframe, a utility computing, or a peer-to-peer computing.

FIG. 2 illustrates a process flow chart of an exemplary method for generating a user experience environment of a device, according to one embodiment. In keeping with the previous examples, particular components described with respect to FIG. 1 are referenced as performing the process in FIG. 2. It should be noted that the components that are referred to as performing the process are for illustrative purposes only. In some implementations, other components, or a different combination of components within a system, may instead perform the process in FIG. 2.

In operation 202, a request for initializing or refreshing the user experience environment 118A of the device 106A is received, where the device 106A is connected to a computing network (e.g., the cloud computing network 102). In operation 204, the user profile 112 associated with the device 106A in the computing network is accessed, where the user profile 112 includes data and metadata defining a communal user experience environment shared by the device 106A and one or more other device (e.g., the devices 106B-N) through the computing network. In operation 206, a type (e.g., hardware configuration) of the device 106A is determined. In one example implementation, the hardware configuration may be determined by any combination of the size of its display unit, its memory size, the speed of its processor, etc. In operation 208, the user experience environment 118A of the device 106A is generated based on the user profile 112 and the type of the device 106A. In the exemplary process illustrated in FIG. 2, it is appreciated that the user profile 112 is generated and/or updated by registered activities (e.g., adding, deleting, and modifying applications, contents, widgets, operating systems, user experience environments, etc.) of the devices sharing the user profile 112 via the computing network (e.g., the cloud computing network 102).

In one embodiment, the user experience environment (e.g., the home screen) of any device that shares the user profile of the device may be configured (e.g., loaded in its entirety or updated) based on the user profile stored and currently maintained in the network. Accordingly, some or all of the devices associated with the user profile may be synchronized. Further, the user experience environment may be displayed according to the type of the display unit that comes with a particular one of the devices. For instance, the user experience environment for a mobile device may be more compact than its counterpart for a personal computer (PC) as the display size of the mobile phone in general is smaller than the display size of the PC. It is appreciated that the methods disclosed in FIG. 2 may be implemented in a form of a machine-readable medium embodying a set of instructions that, when executed by a machine, cause the machine to perform any of the operations disclosed herein.

FIGS. 3 and 4 illustrate a view illustrating an exemplary process for updating a user experience environment of a device, according to one embodiment. FIG. 3 illustrates an example embodiment of updating a user profile associated with a device based on a change or changes associated with an icon on the user experience environment of the device, where the icon may represent a content, an application, or a widget. In FIG. 3, an example configuration page for the user experience environment is presented. In the example, the user experience environment include four different modes, such as an organize mode 302, a work mode 304, a connect mode 306, and a relax mode 308. Using the configuration page, the modes may be modified by adding or deleting one or more applications, contents (not shown), widgets (not shown), etc. In the example embodiment, initially, the organize mode 302 includes apps 310A, B, and D-N, the work mode 304 includes apps 312A-N, the connect mode 306 includes apps 314A-K, and the relax mode 308 includes 316A-N.

In FIG. 3, a particular mode of the user experience environment may be modified by adding, deleting, or moving one or more icons from a group of applications associated with the mode of the user experience environment. For example, the app 310C (e.g., short for application 310C) is added to the group of applications for the organize mode 302. The app 310N is moved from the organize mode 302 to become the app 314L in the connect mode 306. Further, the app 316M is deleted from the relax mode 308 of the user experience environment. In one embodiment, the changes are monitored and stored as meta-data describing the changes in a local memory associated with a device. Then, when the request for refreshing the user experience environment is identified by the device, the changes may be forward to the server storing and maintaining the user profile associated with the device. Then, the changes may be used to update the user profile, thus the communal user experience environment shared by the device and other devices operated by a particular user or users. In an alternative embodiment, the changes may be reported or forwarded to the server in real time. Then, any one of the devices that share the user profile may access the user profile to initialize or update its user experience environment.

FIG. 4 illustrates a user experience environment (e.g., a home screen) of a device executing the organize mode 302. In FIG. 4, the center of the home screen is occupied by the app 310C, which is the currently active application, and other applications (e.g., the apps 310A-B and apps 310D-M in FIG. 3) which correspond to the organize mode 302 are displayed and/or enabled on one side of the screen.

In one embodiment, the user profile of the device may be used to configure a mode of the user experience environment according to a time schedule. For example, the user experience environment of the device may be configured such that the mode of the user experience environment may be set according to a time schedule defined in the user profile, such as setting the organize mode 302 between 6 am and 9 am, the work mode 304 between 9 am and 6 pm, the connect mode 306 between 6 pm and 9 pm, and the relax mode 308 between 9 pm and 9 am.

In one embodiment, the mode of the user experience environment of the device is determined according to a time registered by the device. Then, one or more applications and/or one or more contents (e.g., of media, such as music, movie, etc.) which represent the mode of the user experience environment are enabled and/or displayed on a home screen of the device.

FIG. 5 illustrates a view illustrating an exemplary process for synchronizing multiple devices based on a user profile associated with the multiple devices, according to one embodiment. A user may own a number of devices, such as a mobile phone, a tablet PC, a PC, a laptop, a TV, etc. If the user were to subscribe to the service illustrated in FIGS. 1-4, the user may already have a user profile for the user devices built and maintained in a computing network. In FIG. 5, when a new device (e.g., one among the devices 106A-N) of the user is connected to a computing network (e.g., the cloud computing network 102), where the user profile 112 is stored and maintained, a request for initializing the user experience environment may be automatically generated.

For example, a prompt message requesting the input of the user identification 502 (e.g., a password, a personal information, such as birth date or name of the user, an avatar, etc.) may be displayed on the display unit of the device. Then, the user profile 112 associated with the device is accessed when the user identification 502 is entered by the user. Then, the user profile 112 in the computing network (e.g., the cloud computing network 102) may be located using the user identification 502. Based on the user profile 112, the user experience environment of the device is generated and loaded to the device as the home screen of the device.

Figure 6:
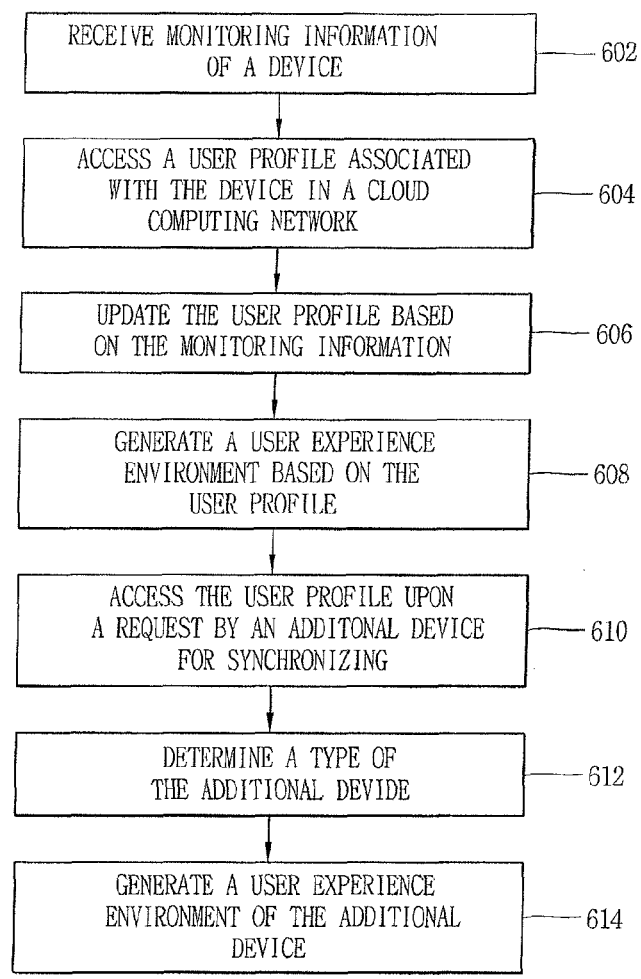
FIG. 6 illustrates a process flow chart of an exemplary method for synchronizing a user experience environment of a second device with a first device, according to one embodiment.

FIG. 6 illustrates a process flow chart of an exemplary method for synchronizing a user experience environment of multiple devices, according to one embodiment. In keeping with the previous examples, particular components described with respect to FIG. 1 are referenced as performing the process in FIG. 6. It should be noted that the components that are referred to as performing the process are for illustrative purposes only. In some implementations, other components, or a different combination of components within a system, may instead perform the process in FIG. 6.

In operation 602, monitoring information of the device 106C is received (e.g., by the server 108 of the cloud computing provider 104A), where the monitoring information comprises data describing a change or changes in the user experience environment 118C of the device 106C. In operation 604, the user profile 112 associated with the device 106C is accessed from the cloud computing network 102 in response to a request by the device 106C for refreshing or updating the user experience environment 118C. In one example embodiment, the user profile 112 comprises data and metadata defining a communal user experience environment shared by the device 106C and one or more other device 106A-B and 106D-N through the cloud computing network 102. In operation 606, the user profile 112 is updated based on the monitoring information. In operation 608, the user experience environment 118C of the device 106C is generated based on the user profile 112 and/or the hardware configuration of the device 106C. In operation 610, the user profile 112 associated with an additional device 106D is accessed upon a request by the additional device 106D for synchronization.

In one example embodiment, the user profile of a second device, which is newly connected to the computing network, may be accessed from the cloud computing network in response to a request by the second device for initializing or loading a user experience environment of the second device for the first time. In one example implementation, a message requesting identification data associated with the user profile may be generated to display on a screen of the second device, and then, the user profile is located in the cloud computing network based on the identification data entered by a user of the second device. In an alternative example embodiment, the user profile associated with a third device (e.g., an existing device) is accessed in the computing network in response to a request by the third device for refreshing or updating a user experience environment of the third device.

In operation 612, a type (e.g., hardware configuration, other features, etc.) of the additional device 106D is determined. For example, the type of the second device or the third device may be determined based on the hardware configuration of the second device or the third device, respectively. In operation 614, the user experience environment 118D of the additional device 106D (e.g., the second device or the third device) is generated based on the user profile 112 and the type of the additional device 106D. It is appreciated that the methods disclosed in FIG. 6 may be implemented in a form of a machine-readable medium embodying a set of instructions that, when executed by a machine, cause the machine to perform any of the operations disclosed herein.

Figure 7:
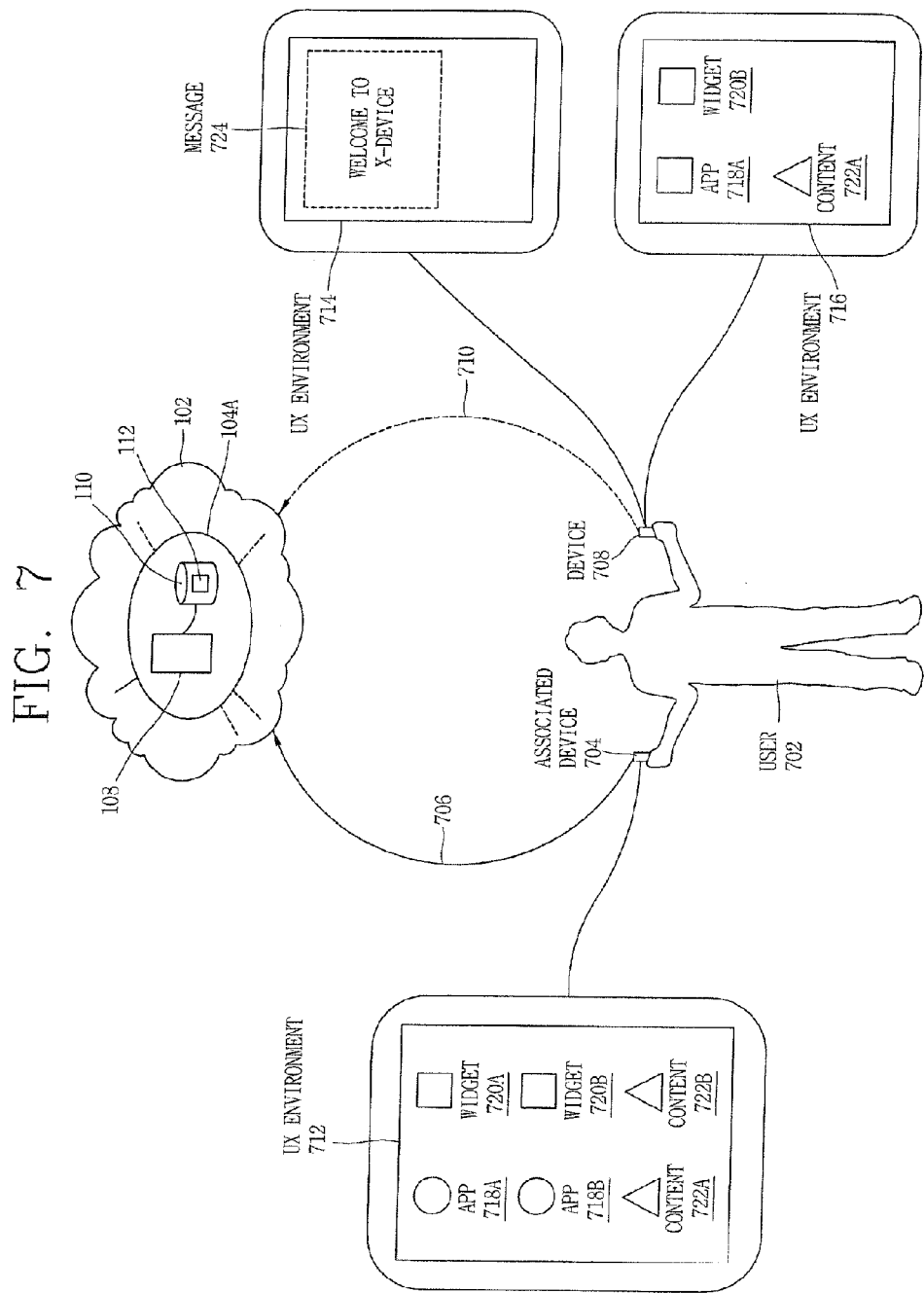
FIGS. 7 and 8 illustrate a view of an exemplary process for synchronizing a device with an associated device through a cloud computing network, according to one embodiment.
Figure 8:
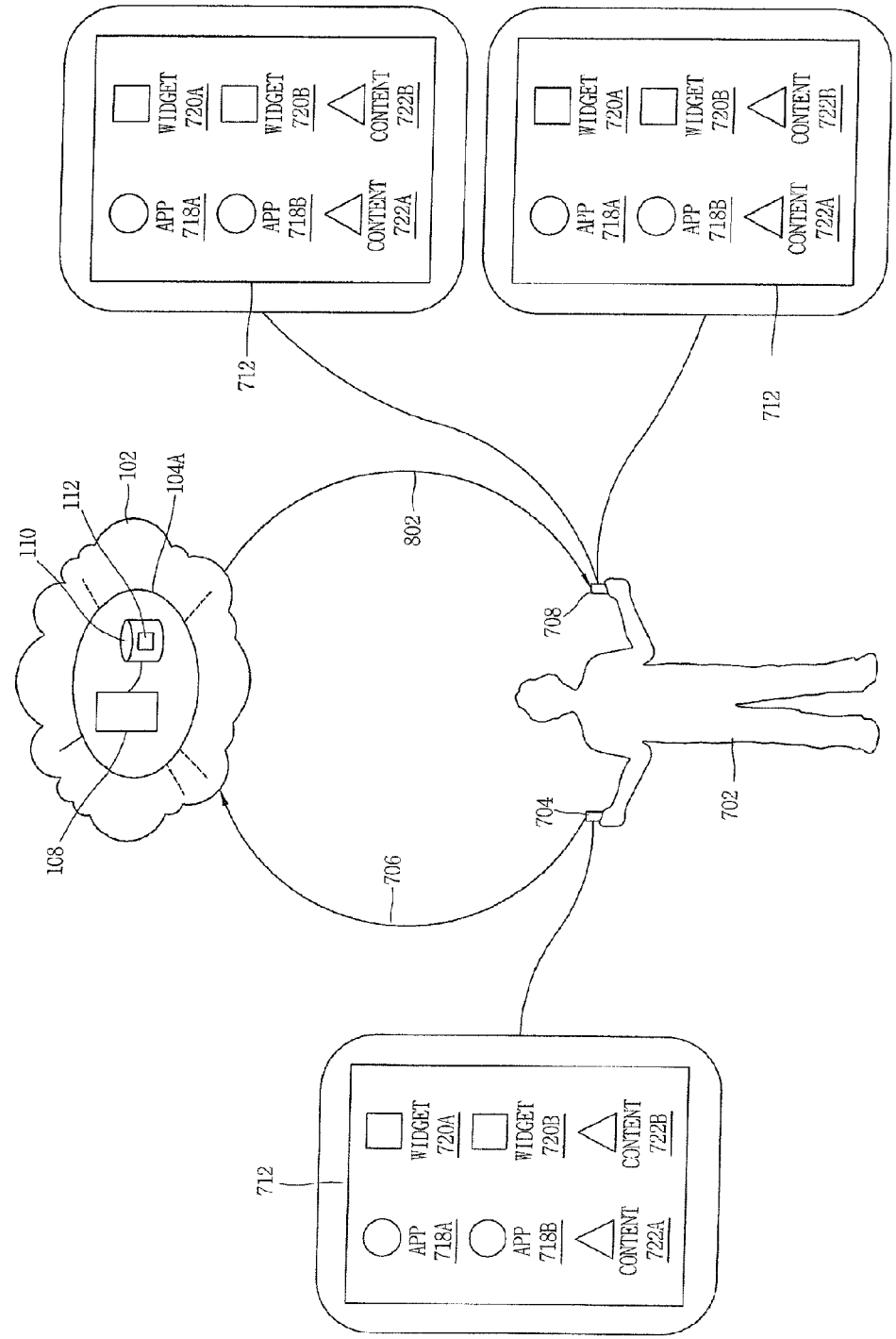

FIGS. 7 and 8 illustrate a view of an exemplary process for synchronizing a device 708 with an associated device 704 through the cloud computing network 102 of FIG. 1, according to one embodiment. FIG. 7 illustrates a view of the device 708 (e.g., a mobile phone, a tablet PC, etc.) prior to synchronizing with the associated device 704 (e.g., a mobile phone, a tablet PC etc.), where the user profile 112 has been formed, as an arrow 706 indicates, based on the usage (e.g., addition, deletion, and/or modification of one or more applications, widgets, contents, operating systems, etc.) of the associated device 704. It is appreciated that the associated device 704 may represent two or more devices used to form the user profile 112.

It is appreciated that the device 708 may be a same type as the associated device 704, and/or is of the same specification (e.g., same hardware and/or software (OS) features) as the associated device 704. It is also appreciated that the device 708 (e.g., a mobile phone) may be different in type as the associated device 704 (e.g., a tablet PC), but is of the same or a similar software specification (e.g., same OS version) as the associated device 704. In addition, it is appreciated that the device 708 may be a same type (e.g., a mobile phone) as the associated device 704 (e.g., a mobile phone), but is of a different software specification (e.g., different OS version) as the associated device 704. It is further appreciated that the device 708 may be different in type and specification from the associated device 704.

As illustrated in FIG. 7, the UX environment 712 of the associated device 704 includes applications 718A-B, widgets 720A-B, and contents 722A-B, where the user profile 112 has been generated based on the use of the associated device 704 (e.g., a tablet PC). In case a user 702 of the associated device 704 happens to lose the associated device 704, the user 702 may synchronize a UX environment 714 of a newly purchased device (e.g., the device 708) based on the user profile 112 via the cloud computing network 102, as a dotted arrow 710 indicates. FIG. 7 shows the newly purchased device displaying a message 724 welcoming the user 702 when the newly purchased device is turned on or connected to the cloud computing network 102 for initialization of its UX environment 714. In addition, the user 702 may synchronize a UX environment 716 of the user's other existing device(s) (e.g., the device 708) to the UX environment 712 of the associated device 704 based on the user profile 112 via the cloud computing network 102. As illustrated in FIG. 7, the UX environment 716 of the existing device(s) may be different from the UX environment 712 of the associated device 704. For example, in FIG. 7, the UX environment 716 includes an APP 718A, a widget 720B, and a content 722A.

In one example, the user profile 112 of the associated device 704 may be initially formed when the associated device 704 is first registered to use a service for synchronizing UX environments of devices owned by the user 702. More particularly, when the associated device 704 is initially purchased by the user 702, the associated device 704 may be equipped with a default UX environment which may include an operating system and one or more applications, widgets, contents, etc.

Then, if the user 702 signs up to use the service or method described in FIGS. 1-6, the user 702 may be asked to make the user ID 502 by entering the name, address, password, etc. of the user 702 when the information is requested on the display unit of the associated device 704. Then, the user ID 502 created is stored in a memory of the associated device 704 upon the registration, and the user ID 502 is also forwarded to the to the cloud computing provider 104A. Upon receiving the user ID 502, the cloud computing provider 104A may generate the user profile 112, which may be associated with one or more other devices sharing the user ID 502 with the associated device 704.

As the user 702 modifies the UX environment of the associated device 704 by changing the operating system and/or adding or deleting one or more applications, widgets, contents, etc., the changes may be monitored and tracked (e.g., by an application program embedded in the associated device 704 which execute the synchronizing service for multiple devices as described in FIGS. 1-6) and forwarded to update the user profile 112. In one exemplary implementation, the forwarding of the changes in the UX environment of the associated device 704 may be performed in real time. In an alternative exemplary implementation, the changes may be forwarded periodically (e.g., every 5 hours). In yet another alternative exemplary implementation, the changes may be forwarded in response to a request by the user 702. For instance, the changes may be forwarded to the cloud computing provider 104A when the user 702 enters a command to have the changes to take effect, thus modifying the user profile 112 in view of the changes.

FIG. 8 illustrates a view of the device 708 (e.g., a mobile phone, a tablet PC, etc.) once its synchronization with the associated device 704 (e.g., a mobile phone, a tablet PC, etc.) is completed. In one embodiment, when the device 708 is connected to the cloud computing network 102 for synchronization with the associated device 704, the user profile 112 generated by the associated device 704 and stored in the cloud computing network 102 is accessed, where the user profile 112 comprises information (e.g., data, metadata, etc.) processed to generate the UX environment 712 (e.g., current state) of the associated device 704. Further, the UX environment 712 of the associated device 704 is generated or downloaded onto the device 708, as an arrow 802 indicates, based on the user profile 112, thus converting the UX environment 714 or the UX environment 716 of the device 708 to the UX environment 712 as illustrated in FIG. 8. In addition, the UX environment 712 realized on the device 708 may be modified based on the software features or specification (e.g., an OS version, a resolution of the display, etc. of the device 708) and/or hardware features or specification (e.g., a number of cameras, types of sensors, etc. implemented on the device 708) of the device 708, as will be illustrated in detail in FIG. 10.

In an alternative embodiment, when the device 708 is connected to the cloud computing network 102 for synchronization with the associated device 704, the software features or specification (e.g., an OS version, a resolution of the display, etc. of the device 708) and hardware features or specification (e.g., a number of cameras, types of sensors, etc. implemented on the device 708) of the device 708 is forwarded to the cloud computing provider 104A, Then, the user profile 112 generated by the associated device 704 and stored in the cloud computing network 102 is accessed, where the user profile 112 comprises information (e.g., data, metadata, etc.) processed to generate the UX environment 712 of the associated device 704. Further, the server 108 of the cloud computing provider 104A may generate the UX environment 712 of the associated device 704 based on the user profile 112 and the software features or specification as well as the hardware features or specification of the device 708, and forward the UX environment 712 as an arrow 802 indicates, thus converting the UX environment 714 or the UX environment 716 of the device 708 to the UX environment 712 as illustrated in FIG. 8. In addition, the UX environment 712 realized on the device 708 may be modified based on the software features or specification and/or hardware features or specification of the device 708, as will be illustrated in detail in FIG. 10.

In one example implementation, when the device 708 connected to the cloud computing provider 104A is a newly purchased device, the device 708 may be equipped with the UX environment 714 by default. Then, the user 702 may register to identify with the user ID 502 that is stored with the cloud computing provider 104A. Upon associating the device 708 to the user ID 502, a user interface view inquiring whether the user 702 of the device 708 wants to synchronize the UX environment of the device 708 based on the user profile 112 may be displayed on the display unit of the device 708. When an input affirming the synchronization of the UX environment of the device 708 is entered, the user profile 112 stored in the cloud computing provider 104A may be accessed.

Further, based on the user profile 112, the UX environment 714 may be updated or modified to synchronize with the UX environment 712 of the associated device 704. During the update of the device 708 to the UX environment 712, the applications (e.g., the app 718A-B), widgets (e.g., the widgets 720A-B), and/or contents (e.g., the contents 722A-B) may be generated in the device 708. The generation of the applications, widgets, and/or contents may be realized by downloading of the same from the cloud computing provider 104A or from the associated device 704, if available. Alternatively, the user profile 112 and the user ID 502 may enable the device 708 to access and configure one or more other service providers of the applications, widgets, and/or contents in the cloud computing network 102. Once the generation of the applications, widgets, and/or contents on the device 708 is initialized on the device 708, the UX environment 712 of the device 708 may be modified based on the software features/specification and/or hardware features/specification of the device 708.

Alternatively, when the device 708 is connected to the cloud computing provider 104A for synchronization of its UX environment, the software features/specification and/or hardware features/specification of the device 708 are forwarded to the cloud computing provider 104A. Then, during the update of the device 708 to the UX environment 712, the applications (e.g., the app 718A-B), widgets (e.g., the widgets 720A-B), and/or contents (e.g., the contents 722A-B) may be generated or prepared by the server 108 of the cloud computing provider 104A and forwarded to the device 708 based on the user profile 112 as well as the software features/specification and/or hardware features/specification of the device 708.

From then on, as the user 702 modifies the UX environment of the device 708 by changing the operating system and/or adding or deleting one or more applications, widgets, contents, etc., the changes may be monitored, tracked (e.g., by an application program embedded in the device 708 which executes the synchronizing service for multiple devices as described in FIGS. 1-6) and forwarded to the cloud computing provider 104A to continue update of the user profile 112.

In another example implementation, when the device 708 connected to the cloud computing provider 104A is an existing device, an input may be entered to synchronize the UX environment 716 of the device 708 with other devices (e.g., the associated device 704) sharing the same user profile 112. Then, the user 702 may be asked to enter the user ID 502. Upon associating the device 708 to the user ID 502, the user interface view inquiring whether the user 702 of the device 708 wants to synchronize the UX environment of the device 708 based on the user profile 112 may be displayed on the display unit of the device 708. When an input affirming the synchronization of the UX environment of the device 708 is entered, the user profile 112 stored in the cloud computing provider 104A may be accessed.

It is appreciated that the synchronization of the UX environment 716 of the device 708 (e.g., the existing device) to the UX environment 712 of the associated device 704 may be similar to the case of the newly purchased device. Further, as the user 702 modifies the UX environment 712 of the device 708 by changing the operating system and/or adding or deleting one or more applications, widgets, contents, etc., the changes may be monitored, tracked (e.g., by an application program embedded in the device 708 which executes the synchronizing service for multiple devices as described in FIGS. 1-6) and forwarded to the cloud computing provider 104A to continue to update the user profile 112.

Figure 9:
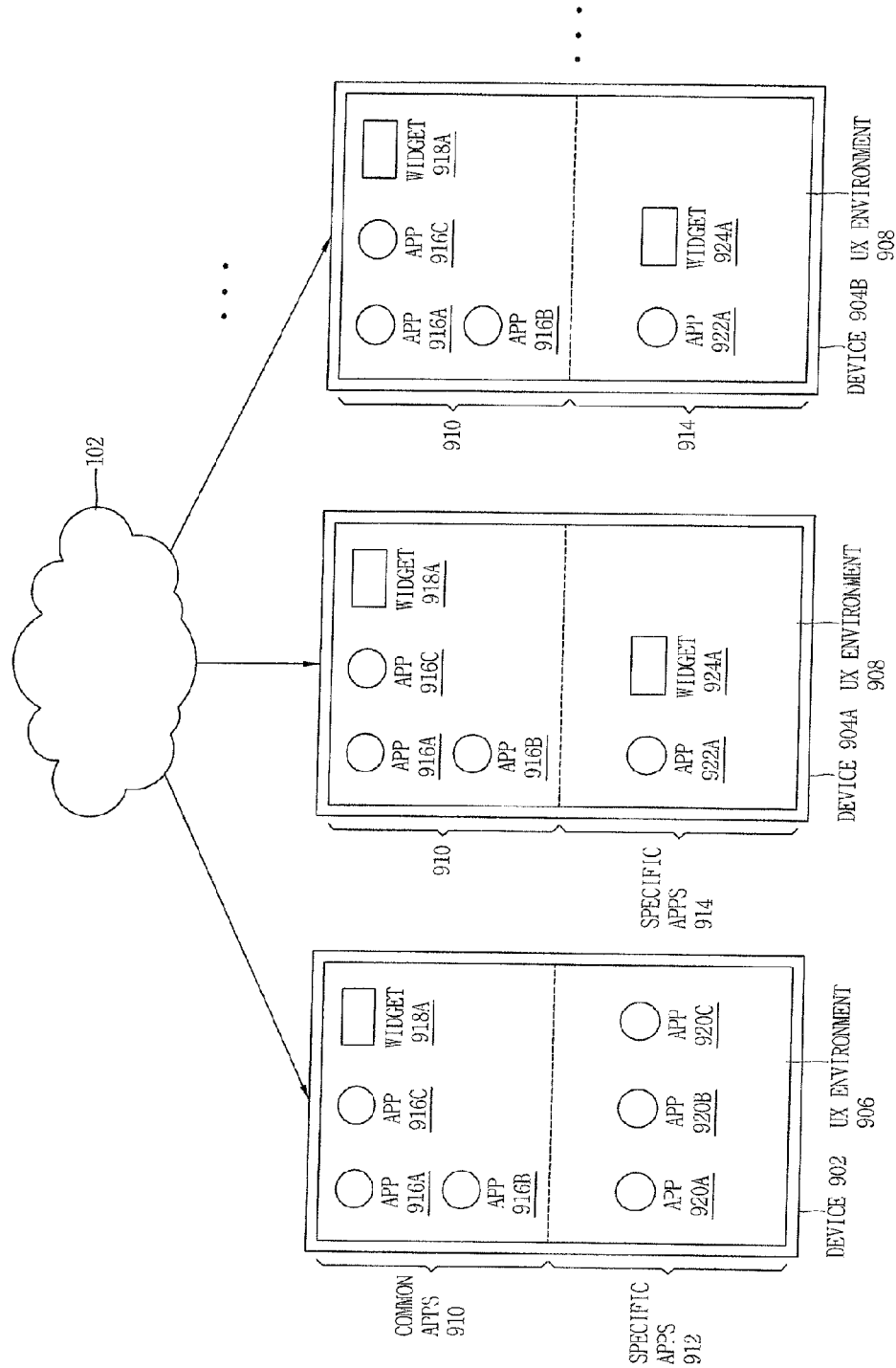
FIG. 9 illustrates a view of an exemplary process for generating or downloading applications via a cloud computing network of FIG. 1, according to one embodiment.

FIG. 9 illustrates a view of an exemplary process for downloading applications from the cloud computing network 102 of FIG. 1, according to one embodiment. In FIG. 9, the type (e.g., hardware configuration, specification, version, feature, etc.) of a device 902 is different from the type of devices 904A-B. Since the type of the device 902 is different from the type of the devices 904A-B, a UX environment 906 of the device 902 may be in a configuration different from a UX environment 908 of the devices 904A-B. That is, the applications, widgets, contents, operating system, etc. which form the UX environment 906 are different from their counterpart on the UX environment 908.

In one embodiment, one or more applications, widgets, contents, and/or operating system (e.g., common apps 910) are generated or downloaded to the devices 902 and 904A-B irrespective of the type of the devices. That is, when the UX environment 906 or the UX environment 908 is generated on the device 902 and on the devices 904A-B, respectively, applications 916A-C and a widget 918A are included in each of the UX environments regardless of the type of the devices. In another embodiment, some of the applications, widgets, contents, operating system, etc. (e.g., specific apps 912 and 914) are discriminately generated or downloaded to the devices 902 and 904A-B based on the type of the devices 902 and 904A-B. In FIG. 9, the specific apps 912, which include apps 920A-C, are generated only on the UX environment 906 of the device 902, whereas the specific apps 914, which include an app 922A and a widget 924A, are generated on the UX environment 908 of the device 904A-B.

Figure 10:
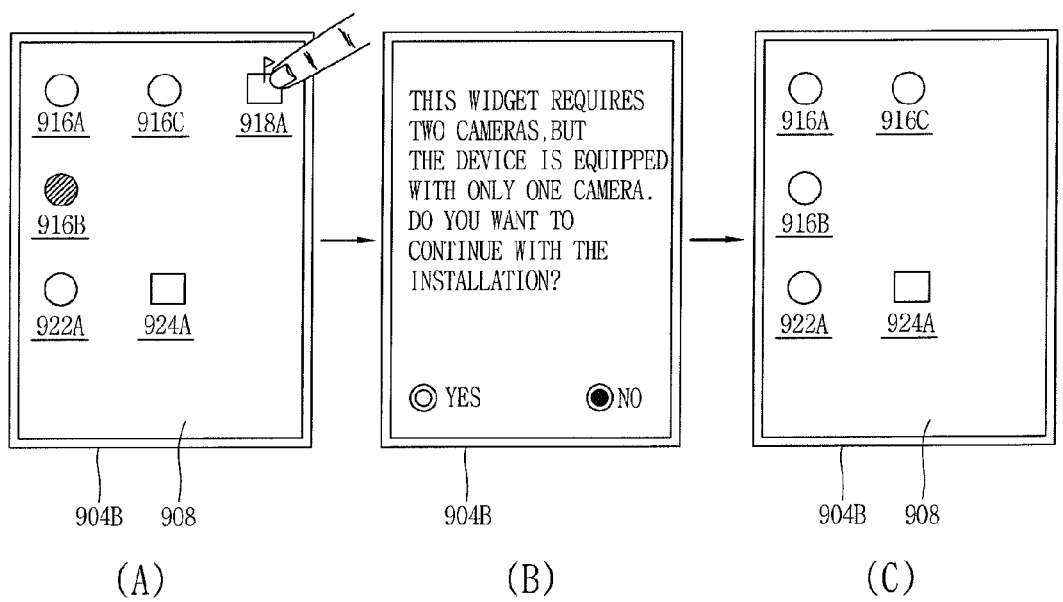
FIG. 10 illustrates a view of an exemplary process for modifying a user experience environment, according to one embodiment.

FIG. 10 illustrates a view of an exemplary process for modifying the user experience environment 908, according to one embodiment. In one embodiment, the UX environment realized on a device, aftermath of the process illustrated in FIGS. 7-9, may be modified based on the software features or specification (e.g., an OS version, a resolution of the display, etc.) and/or hardware features or specification (e.g., a number of cameras, types of sensors, etc.) of the device. For example, in process (A) of FIG. 10, the UX environment 908 generated on the device 904B comprises an icon representing the app 916B and an icon representing the widget 918A in different configurations than the rest. That is, the icon for the app 916B is displayed in a shaded look to indicate that the app 916B is not entirely compatible with the OS environment of the device 904B and/or the hardware features of the device 904B. For instance, the app 916B may require two cameras for it to fully operate, where the device 904B is equipped with only one camera. Alternatively, instead of the shaded look, the incompatibility may be represented by a flag featured on the application, widget, or content, such as the flag on the widget 918A.

Upon pressing the icon of the incompatible application, widget, or content, a text or graphic explaining the nature of the incompatibility is displayed on the device 904B, as illustrated in process (B) of FIG. 10. Then, the user of the device 904B is prompted to either continue with or forego the installation of the widget 918A. In process (C) of FIG. 10, the icon for the widget 918A is deleted from the UX environment 908 as the user of the device 904B chose not to install the widget 918A incompatible with the OS version and/or the hardware features or specification of the device 904B. However, as for the app 916B, the user of the device 904B chose to install the app 916B in spite of the incompatibility, the icon for the app 916B is turned from the shaded look to a regular look.

Figure 11:
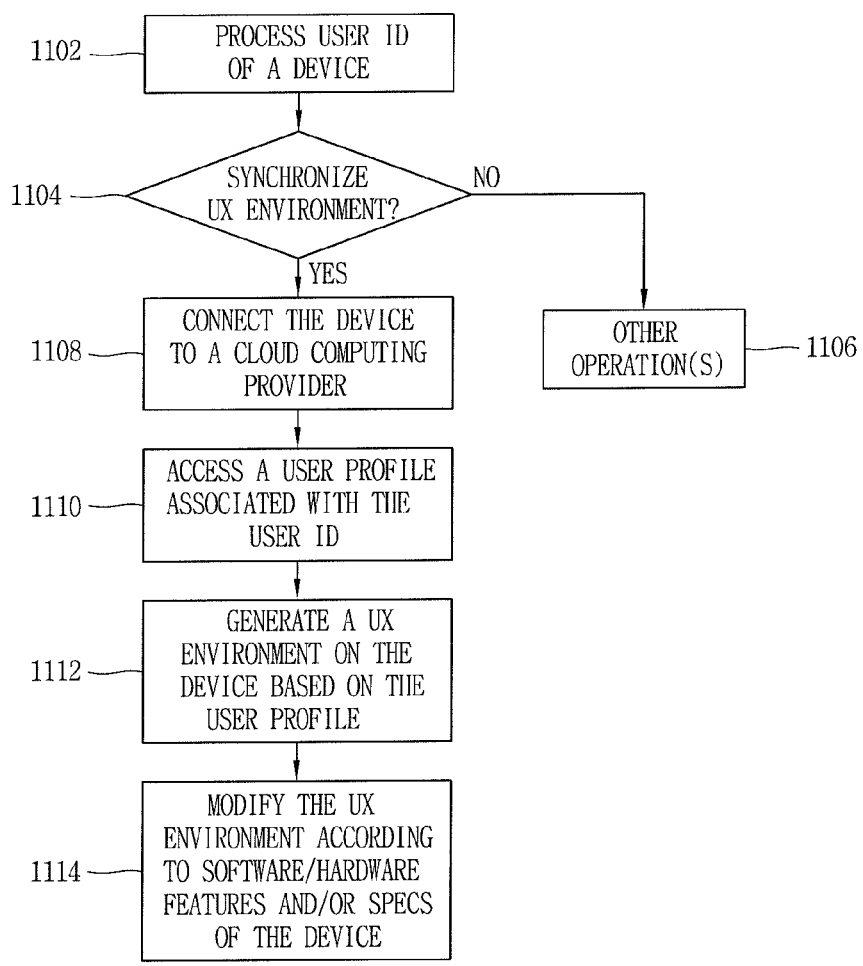
FIG. 11 illustrates a process flow chart of an exemplary method for synchronizing a user experience environment of a device, according to one embodiment.

FIG. 11 illustrates a process flow chart of an exemplary method for synchronizing a user experience environment of a device, according to one embodiment. In keeping with the previous examples, particular components described with respect to FIG. 8 are referenced as performing the process in FIG. 11. It should be noted that the components that are referred to as performing the process are for illustrative purposes only. In some implementations, other components, or a different combination of components within a system, may instead perform the process in FIG. 11.

In operation 1102, the user ID 502 of the device 708 is processed, where the user ID 502 may be entered by the user 702 of the device 708 upon viewing a prompt to enter the user ID 502 displayed on the device 708. In operation 1104, the display unit of the device 708 generates an inquiry whether to synchronize the UX environment 714 (e.g., if the device 708 is new) or the UX environment 716 (e.g., if the device 708 is existing) to the communal UX environment (e.g., the UX environment 712) of other associated devices (e.g., the device 704). If the answer is 'no,' then other operation(s) may be performed in operation 1106. If the answer is 'yes,' then the device 708 is connected to the cloud computing provider 104A via the cloud computing network 102 in operation 1108. In operation 1110, the user profile 112 associated with the user ID 502 is accessed.

Then, in operation 1112, the UX environment 712 is generated on the device 708 based on the user profile 112, where the user profile 112 comprises information collected during the usage of the UX environment 712 of the associated device 704, thus synchronizing the UX environment 714 (e.g., if new) or the UX environment 716 (e.g., if existing) of the device 708 with the UX environment 712 of the associated device 704. In operation 1114, the UX environment 712 (e.g., the applications, widgets, contents, or other elements) of the device 708 is modified according to software/hardware features and/or specification of the device 708. It is appreciated that the modification process may be performed transparent to the user 702 by evaluating the compatibility of the individual elements of the UX environment 712 and installing those elements which are compatible with the OS environment or the hardware features of the device 708 without any input by the user 702. Alternatively, the modification process may be performed in such a way to provide the user 702 a choice for the installation of the incompatible elements, as illustrated in FIG. 10.

It is appreciated that the methods disclosed in FIG. 11 may be implemented in a form of a machine-readable medium embodying a set of instructions that, when executed by a machine, cause the machine to perform any of the operations disclosed herein.

Figure 12:
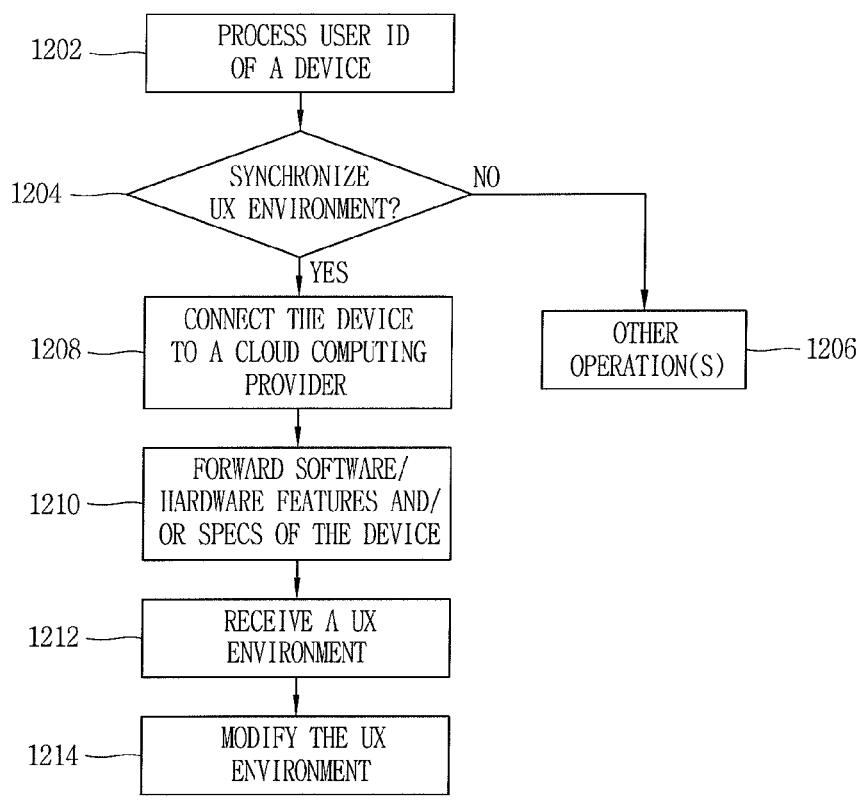
FIG. 12 illustrates a process flow chart of another exemplary method for synchronizing a user experience environment of a device, according to one embodiment.

FIG. 12 illustrates a process flow chart of another exemplary method for synchronizing a user experience environment of a device, according to one embodiment. In keeping with the previous examples, particular components described with respect to FIG. 8 are referenced as performing the process in FIG. 12. It should be noted that the components that are referred to as performing the process are for illustrative purposes only. In some implementations, other components, or a different combination of components within a system, may instead perform the process in FIG. 12.

In operation 1202, the user ID 502 of the device 708 is processed, where the user ID 502 may be entered by the user 702 of the device 708 upon viewing a prompt to enter the user ID 502 displayed on the device 708. In operation 1204, the display unit of the device 708 generates an inquiry whether to synchronize the UX environment 714 (e.g., if the device 708 is new) or the UX environment 716 (e.g., if the device 708 is existing) to the communal UX environment (e.g., the UX environment 712) of other associated devices (e.g., the device 704). If the answer is 'no,' then other operation(s) may be performed in operation 1206. If the answer is 'yes,' then the device 708 is connected to the cloud computing provider 104A via the cloud computing network 102 in operation 1208. In operation 1210, the software/hardware features and/or specification of the device 708 is forwarded to the cloud computing provider 104A via the cloud computing network 102.

Then, in operation 1212, the UX environment 712 is generated by the cloud computing provider 104A based on the user profile 112 as well as the software/hardware features and/or specification of the device 708. Then, the UX environment 712 is received by the device 708 in operation 1212. In operation 1214, the UX environment 712 (e.g., the applications, widgets, contents, or other elements) of the device 708 is modified according to software/hardware features and/or specification of the device 708. The modification process may be performed in such a way to provide the user 702 a choice for the installation of the incompatible elements, as illustrated in FIG. 10, if the user 702 is not quite satisfied with the UX environment 712 forwarded by the cloud computing provider 104A.

It is appreciated that the methods disclosed in FIG. 12 may be implemented in a form of a machine-readable medium embodying a set of instructions that, when executed by a machine, cause the machine to perform any of the operations disclosed herein.

Figure 13:
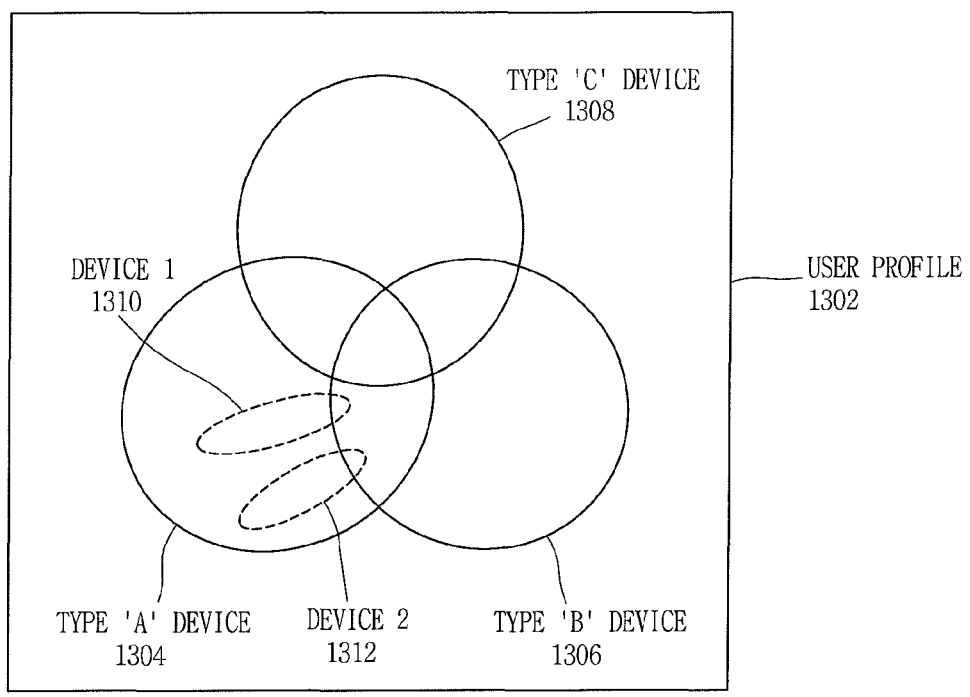
FIG. 13 illustrates an exploded view of an exemplary user profile, according to one embodiment.

FIG. 13 illustrates an exploded view of an exemplary user profile 1302, according to one embodiment. It is appreciated that the exemplary user profile 1302 is an embodiment of the user profile 112 in FIG. 1. In FIG. 13, the user profile 1302 comprises information collected for the usage of type 'A' device 1304, type 'B' device 1306, and type 'C' device 1308 through the cloud computing network 102. For example, the type 'A' device is a mobile phone, the type 'B' device is a table PC, and the type 'C' device is a laptop. Further, the type 'A' device 1304 comprises device 1 1310 and device 2 1312.

In one embodiment, based on the user profile 1302, a UX environment of a first device which is configured to share the user profile 1302 (e.g., such as assigned or registered with the user ID associated with the user profile 1302) is generated. During the synchronization of the UX environment, any applications, widgets, contents, and/or other elements obtained during the usage of any device that shares the user profile 1302 may be implemented on the UX environment of the first device. In an alternative embodiment, a UX environment of a second device is generated based on a user profile associated with a particular type of device (e.g., the user profile associated with the type 'A' device 1304). That is, any applications, widgets, contents, and/or other elements obtained during the usage of any device that shares the user profile associated with the particular type of device may be implemented on the UX environment of the second device.

In yet another alternative embodiment, a UX environment of a third device is generated based on a user profile associated with a particular device (e.g., the user profile associated with the device 1 1310). That is, any applications, widgets, contents, and/or other elements obtained during the usage of any device that shares the user profile associated with the particular device may be implemented on the UX environment of the third device. It is appreciated that the synchronization process of the UX environment in the different embodiments described above may be similar to the ones described in FIGS. 7-12.

FIG. 14 illustrates an exemplary process for synchronizing a device with an associated device of same type through the cloud computing network of FIG. 1, according to one embodiment. In process (A) of FIG. 14, a user 1402 of a mobile device 1404 may use the mobile device 1404 for a prolonged period time after registering the mobile device 1404 with a service for user profile based configuration of UX environment, as illustrated in FIG. 1-13. It is appreciated that the service for user profile based configuration of UX environment may be realized through an application installed on the mobile device 1404 or through subscribing from a website. Upon registration of the mobile device 1404 for the service, the user profile 112 is generated, updated and stored via the cloud computing network 102, as a UX environment 1406 of the mobile device 1404 is modified throughout the usage of the mobile device 1404.

Then, one day, as illustrated in process (B) of FIG. 14, the mobile device 1404 may be lost, prompting the user 1402 to buy new mobile device 1408 as illustrated in process (C) of FIG. 14. Since the user 1402 is signed up to subscribe the service for user profile based configuration of UX environment, the user 1402 may be able to synchronize a UX environment of the mobile device 1408 with the UX environment 1406 of the user's old (e.g., lost) mobile device 1404 in no time. Thus, the embodiments of the user profile based configuration of UX environment, as illustrated in FIGS. 1-14, may make it one step process for implementing the UX environment of a device, such as applications, widgets, contents, etc., that is configured or registered to share the user profile of one or more devices via a cloud computing network.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and features disclosed herein.

What is claimed is:

1. A device for generating a user experience environment, the user experience environment including at least one displayed icon corresponding with at least one application, the device comprising:
a memory; and
a processor coupled to the memory and configured to:
access a user profile associated with the device in a computing network when the device is connected to the computing network to implement a user experience environment synchronized between the device and at least one other device through the computing network, wherein the user profile comprises information collected during usage of the device and the at least one other device;
determine a type of the device; and
generate the user experience environment of the device based on the user profile and the type of the device, wherein the user experience environment of the device includes the at least one application, and wherein a first subset of the at least one application is downloaded to the device irrespective of the type of the device, and a second subset of the at least one application is downloaded only to the type of device, and
wherein an icon for each application of the at least one application which is not compatible with the device is displayed in a shaded appearance to indicate an incompatibility of said each application with the device.

2. The device of claim 1, wherein each of the at least one other device is a smart device.

3. The device of claim 2, wherein the smart device is a mobile phone, a personal computer (PC), a laptop computer, a tablet PC, or a television.

4. The device of claim 1, wherein the user experience environment comprises a home screen of the device.

5. The device of claim 1, wherein the computing network is a cloud computing network.

6. The device of claim 5, wherein the user profile is stored in a storage device of the cloud computing network.

\* \* \* \* \*